Patented June 21, 1949

2,474,024

UNITED STATES PATENT OFFICE 2,474,024

DISAZO DYESTUFFS

Carl Ivar Anderson, Buffalo, N. Y., assignor to Allied Chemical & Dye Corporation, New York, N. Y., a corporation of New York No Drawing. Application November 29, 1944, Serial No. 565,795

3 Claims. (Cl. 260—176)

This invention relates to secondary disazo dyestuffs suitable for dyeing animal and synthetic polyamide fiber.

According to United States Patents 1,199,233 and 1,199,234 to Boeniger, chromable secondary disazo dyestuffs obtained by coupling an orthodiazophenol with an aminonaphthol sulfonic acid as middle component, diazotizing the resulting amino azo compound and coupling with a pyrazolone compound as end component yield colorations which, when chromed, are said to have excellent fastness to milling and potting, and very good fastness to light. However, according to German Patent 346,250 to Bayer, the aforesaid dyestuffs, containing an aminonaphthol sulfonic acid as the middle component, have the disadvantage that they dye unevenly. This disadvantage is said to be eliminated by employing, as middle component, an unsulfonated aminonaphthol.

I have now discovered that secondary disazo dyestuffs having as the diazo component a radical of a diazotizable aromatic primary amine containing a substituent of the class consisting of the hydroxyl and the carboxyl group in ortho position to the diazotizable amino group, having as the middle component the radical of an aminonaphthol sulfonic acid which is linked to said diazo component by an azo linkage in ortho position to the naphtholic hydroxyl group and which contains a diazotizable amino group, and having as the end component the radical of an aromatic acylacetic acid type coupling component which is capable of coupling by virtue of the presence of an active methylene group therein (e. g., the radical of a coupling component of the group consisting of acylacetic acid esters, -amides, and -nitriles, and methylene diketones, said end component containing at least one aromatic nucleus) are valuable dyestuffs for animal fiber and synthetic polyamide fiber. For example, in the form of the sodium salts, they are dark, water-soluble powders dyeing animal fiber, such as wool or silk, or synthetic polyamide fiber, such as nylon, from an acid bath in level shades ranging from green to blue to violet to scarlet to brown to grey, which, upon aftertreatment with a metallizing agent suitable for metallizing azo dyestuffs, and especially a chromium compound (such as potassium dichromate), yield shades ranging from green to olive to brown to grey to black, showing increased fastness properties, especially to light, and having outstanding fastness to washing and fulling. Despite the presence of an aminonaphthol sulfonic acid residue as middle component, the colorations thus produced are uniform. Moreover, the shades produced with the dyestuffs of this invention are distinguished from colorations similarly produced with otherwise similar disazo dyestuffs containing a pyrazolone compound instead of an aromatic acylacetic acid type coupling component as the end component, in that they yield brighter and generally yellower shades (when afterchromed).

The dyestuffs of this invention have the general formula

A—N=N—M—N=N—E wherein A, M and E, respectively, represent the radicals of the diazo component, the middle component, and the end component as hereinbefore specified, the azo linkage between A and M being attached to the latter in ortho position to the naphtholic hydroxyl group thereof, and the azo linkage between M and E being attached to the latter at the active methylene group.

They may be in the form of their alkali metal salts or in the form of heavy metal complexes such as those of copper, chromium, cobalt and nickel.

Those dyestuffs are preferred in which the diazo component is a mononuclear ortho-hydroxy- (or ortho-carboxy-) substituted primary aromatic amine; the middle component is a primary aminonaphthol sulfonic acid, particularly a primary amino-alpha-naphthol monosulfonic acid, and especially 1,8-aminonaphthol-4-sulfonic acid and 2,8-aminonaphthol-6-sulfonic acid; and the end component is an acylacetic acid arylide, especially an aceto-acetanilide.

The dyestuffs of this invention can be prepared by coupling 1 mol of a diazotized orthohydroxy or othro-carboxy aromatic amine in alkaline solution with 1 mol of an aminonaphthol sulfonic acid containing a diazotizable amino group, diazotizing the resulting aminoazo compound, and coupling with 1 mol of an aromatic acylacetic acid type coupling component, preferably an acylacetic acid arylide. By effecting the initial coupling in alkaline solution, the azo group is introduced into the naphthalene nucleus of the middle component in ortho position to the naphtholic hydroxyl group thereof. Preferably, the intermediate aminoazo compound is isolated from the first coupling reaction mixture before rediazotization and final coupling, so as to eliminate impurities, particularly uncombined aminonaphthol sulfonates, which form colored impurities during the second diazotization and final coupling and thereby adversely affect the shade of the disazo dyestuff. The final coupling can be carried out in alkaline to weakly acid medium (e. g., at a pH of about 4.5 to 6).

The invention will be illustrated by the following examples, wherein parts are by weight and temperatures are in degrees centigrade.

EXAMPLE 1

61.6 parts (0.4 mol of 4-nitro-2-amino-phenol are slurried in 1300 parts of water containing 116 parts of 20° Bé. hydrochloric acid, and the slurry cooled to 0° by addition of ice. 28 parts of sodium nitrite are added in the form of a 20% aqueous solution, and the reaction mass is agitated at 0° for two hours to effect diazotization. The resulting solution of the diazo compound is gradually added to an aqueous mixture containing 95.6 parts (0.4 mol) of 1-amino-8-hydroxy-naphthalene-4-sulfonic acid, and 120 parts of sodium carbonate dissolved in 1300 parts of water, cooled with ice to 0°. The resulting mixture is agitated for about 16 hours at about 10° to effect coupling. The resulting aminoazo compound is separated from the coupling mixture by heating the solution to 70°, adding 600 parts of sodium chloride, cooling to 50° and recovering the precipitated aminoazo compound by filtration in the form of a filter cake.

The filter cake is dissolved in 1200 parts of water at 70°, cooled to 35°, and 28 parts of sodium nitrite are added. The resulting solution is added to a mixture of 167 parts of 20° Bé. hydrochloric acid and ice. After agitating for 16 hours at about 0° to effect diazotization, 6 parts of sulfamic acid are introduced to eliminate any excess of nitrous acid.

88 parts (0.43 mol) of powdered 2-methoxy-acetoacetanilide and 160 parts of crystalline sodium acetate (NaC₂H₃O₂.3H₂O) are added to the aqueous solution of the diazoazo compound, and the mixture agitated for about 16 hours at about 10° to complete the coupling. The mixture is then heated to 70° and 96 parts of soda ash are added to form the sodium salt of the dyestuff, 4 parts of "soluble oil" being added to prevent excessive foaming. The dyestuff is recovered by adding 750 parts of sodium chloride to the coupling mixture, cooling to 50° and filtering out the precipitated dyestuff and drying the filter cake.

The resulting dyestuff is a dark, water-soluble powder having the following probable formula:

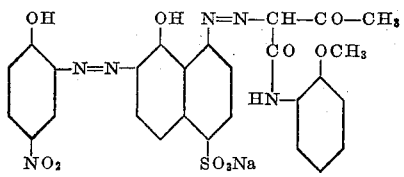

It dyes wool in level dull dark brown shades from an acid bath, which upon aftertreatment with a chroming agent become olive green. The chromed dyeing shows excellent fastness to washing, fulling and especially to light. Similar shades are obtained by applying the dyestuff to fiber pretreated with a chroming agent, or by applying the dyestuff and chroming agent to the fiber simultaneously.

A substantially similar product is obtained when the final coupling is effected in slightly acid medium having a pH of about 6.

EXAMPLE 2

By employing 76 parts (0.43 mol) acetoacetanilide instead of the 2-methoxy-acetoacetanilide in Example 1, a related dyestuff is obtained which, when applied to wool and subsequently chromed, produces a substantially identical shade, somewhat inferior in fastness to light, but equal in fastness to washing and fulling to the dyestuff of Example 1.

EXAMPLE 3

41.1 parts (0.3 mol) of anthranilic acid are dissolved in 1,000 parts of water containing 87 parts of 20° Bé. hydrochloric acid. The resulting solution is cooled with ice to 0°. 21 parts of sodium nitrite are added in the form of a 20% aqueous solution and the mixture is agitated for about 1 hour at 0° to 5° to complete diazotization. The resulting solution is added to an agitated solution containing 71.7 parts of 2-amino-8-hydroxy-naphthalene-6-sulfonic acid and 90 parts of soda ash in 1,000 parts of water, and cooled to 0° by addition of ice. The reaction mixture is agitated for about 16 hours at 10° in order to complete the coupling. The resulting aminoazo compound is permitted to crystallize and is recovered in the form of a filter cake by filtration. The filter cake is added to 900 parts of water containing 21 parts of sodium nitrite, the resulting solution is added with agitation to a mixture of 125 parts of 20° Bé. hydrochloric acid and ice, and the mixture is agitated at 0° to 5° for about 16 hours to complete the diazotization.

54 parts (0.3 mol) of acetoacetanilide and 120 parts of crystalline sodium acetate $$(NaC_2H_3O_2.3H_2O)$$

are added to the resulting solution of the diazoazo compound and the mixture is agitated for about 16 hours at 10° to complete the coupling. The mixture is then heated to 70°, 72 parts of soda ash are added to dissolve the dyestuff, and 120 parts of sodium chloride are introduced to salt out the product. After cooling to about 25°, the dyestuff is recovered by filtration in the form of a filter cake and dried.

The resulting dyestuff is a dark, water-soluble powder having the following probable formula:

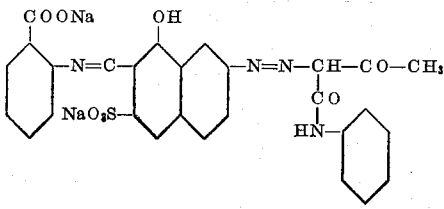

It dyes wool from an acid bath in level bright scarlet shades which become reddish dark-brown on chroming. The chromed dyeings possess excellent fastness to light, washing and fulling.

EXAMPLE 4

By substituting 62 parts (0.3 mol) of 2-methoxy-acetoacetanilide for the acetoacetanilide employed in Example 3, a related dyestuff is obtained which yields somewhat yellower chromed shades, having substantially the same fastness properties as the dyestuff of Example 3.

EXAMPLE 5

70.2 parts (0.3 mol) of 6-nitro-2-amino-phenol-4-sulfonic acid are dissolved in 1,000 parts of water, together with sufficient soda ash to form a solution slightly alkaline to Brilliant Yellow. The resulting solution is made slightly acid to Congo Red by adding hydrochloric acid, whereby the free sulfonic acid is precipitated in finely divided form. 87 parts of 20° Bé. hydrochloric acid are added and the mixture is cooled to 0° with ice. 21 parts of sodium nitrite are added in the form of a 20% aqueous solution and the reaction mixture is agitated for about 3 hours at 0° to 5° to complete the diazotization.

The resulting solution of the diazo compound is added to a solution of 71.7 parts (0.3 mol) of 1-amino-8-hydroxynaphthalene -4-sulfonic acid and 90 parts of sodium carbonate in 1,000 parts of water at 0°. The coupling mixture is agitated for about 16 hours at 10°, then heated to 70°, and sodium chloride is added to promote crystallization of the amino compound. After cooling to 50°, the mixture is filtered to recover the crystalline product in the form of a filter cake.

The filter cake is mixed with 900 parts of water containing 21 parts of sodium nitrite, and the solution is added to 125 parts of 20° Bé. hydrochloric acid. After agitating for about 16 hours at 0° to 5°, 54 parts (0.3 mol) of acetoacetanilide and 120 parts of crystalline sodium acetate are added to the diazoazo solution. The mixture is agitated for about 16 hours, then heated to 70° and 72 parts of sodium carbonate are added to dissolve the dyestuff. The product is then salted out by addition of sodium chloride, and recovered in the form of a filter cake by filtration after cooling to 50°, and the filter cake is dried.

The resulting dyestuff is a dark, water-soluble powder having the following formula:

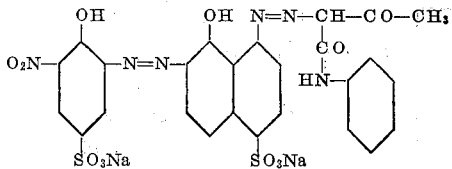

It dyes wool in level blue-green shades from an acid dye bath. The shades become yellow-green on chroming, and show excellent fastness properties.

EXAMPLE 6

By substituting an equivalent amount of 2-methoxy-acetoacetanilide for the acetoacetanilide employed in Example 5, a related dyestuff is obtained which gives chromed shades on wool that are somewhat brighter, but otherwise similar, and having fastness properties similar to those of the dyestuff of Example 5.

The following table lists additional examples of dyestuffs obtained in a similar manner from ortho-hydroxy- and ortho-carboxy aromatic amines, 1,8-aminonaphthol-4-sulfonic acids and acetoacetic acid anilides in accordance with the invention, and the shades of dyeings on wool obtained therewith, alone and upon treatment with chromium compounds.

Table

| Example No. | First Component (A) | Middle Component (M) | End Component (E) | Shade on Wool | Chromed Shade on Wool |
|---|---|---|---|---|---|
| 7 | OH, NH$_2$, Cl (phenyl) | OH, NH$_2$, SO$_3$H (naphthyl) | CH$_3$COCH$_2$CONH—(phenyl) | red blue | green-black. |
| 8 | OH, NH$_2$, Cl (phenyl) | OH, NH$_2$, SO$_3$H (naphthyl) | CH$_3$COCH$_2$CONH—(phenyl-OCH$_3$) | weak red-blue | weak green-black. |
| 9 | OH, NH$_2$, SO$_3$H (phenyl) | OH, NH$_2$, SO$_3$H (naphthyl) | CH$_3$COCH$_2$CONH—(phenyl) | red brown | yellow-olive. |
| 10 | OH, NH$_2$, SO$_3$H (phenyl) | OH, NH$_2$, SO$_3$H (naphthyl) | CH$_3$COCH$_2$CONH—(phenyl-OCH$_3$) | ...do... | Do. |
| 11 | OH, HO$_3$S—, NH$_2$, Cl (phenyl) | OH, NH$_2$, SO$_3$H (naphthyl) | CH$_3$COCH$_2$CONH—(phenyl) | ...do... | Do. |

| Example No. | First Component (A) | Middle Component (M) | End Component (E) | Shade on Wool | Chromed Shade on Wool |
|---|---|---|---|---|---|
| 12 | 2-amino-1-hydroxy-4-chloro-benzene-sulfonic acid (HO₃S, OH, NH₂, Cl) | 1-amino-2-hydroxy-naphthalene-4-sulfonic acid (OH, NH₂, SO₃H) | CH₃COCH₂CONH—C₆H₄(OCH₃) | red brown | yellow-olive. |
| 13 | 2-amino-1-hydroxy-4-nitro-benzene-sulfonic acid (HO₃S, OH, NH₂, NO₂) | 1-amino-2-hydroxy-naphthalene-4-sulfonic acid | CH₃COCH₂CONH—C₆H₅ | blue-green | bright yellow-green. |
| 14 | 2-amino-1-hydroxy-6-nitro-benzene-sulfonic acid (HO₃S, OH, NH₂, NO₂) | 1-amino-2-hydroxy-naphthalene-4-sulfonic acid | CH₃COCH₂CONH—C₆H₄(OCH₃) | ——do—— | Do. |
| 15 | 1-amino-2-hydroxy-naphthalene-4-sulfonic acid (O₃H, NH₂, OH, SO₃H) | 1-amino-2-hydroxy-naphthalene-4-sulfonic acid | CH₃COCH₂CONH—C₆H₅ | green grey | yellow-olive. |
| 16 | 1-amino-2-hydroxy-6-nitro-naphthalene-4-sulfonic acid (O₂N, NH₂, OH, SO₃H) | 1-amino-2-hydroxy-naphthalene-4-sulfonic acid | CH₃COCH₂CONH—C₆H₃(Cl)(Cl) | yellow-brown | weak dull red-brown. |
| 17 | 2-amino-1-hydroxy-4-sulfamyl-benzene (OH, NH₂, SO₂NH₂) | 1-amino-2-hydroxy-naphthalene-4-sulfonic acid | CH₃COCH₂CONH—C₆H₅ | red-brown | dull yellow-blue. |
| 18 | 2-amino-1-hydroxy-4-sulfamyl-benzene (OH, NH₂, SO₂NH₂) | 1-amino-2-hydroxy-naphthalene-4-sulfonic acid | CH₃COCH₂CONH—C₆H₃(Cl)(Cl) | dull red-brown | dull-grey. |
| 19 | anthranilic acid (NH₂, COOH) | 1-amino-2-hydroxy-naphthalene-4-sulfonic acid | CO₂COCH₂CONH—C₆H₅ | claret | purplish dark-brown. |
| 20 | anthranilic acid (NH₂, COOH) | 1-amino-2-hydroxy-naphthalene-4-sulfonic acid | CH₃COCH₂CONH—C₆H₄(OCH₃) | ——do—— | reddish dark-brown. |

The ortho-hydroxy or ortho-carboxy aromatic amines employed as initial diazo components are preferably mononuclear; but polynuclear components, especially of the naphthalene series, may also be employed. The aforesaid diazo components may be otherwise unsubstituted or may contain one or more additional substituents, such as for example, chlorine, nitro, carboxyl, sulfonamide or sulfonic acid groups. Suitable diazo components in addition to those employed in the foregoing examples, include:

2-amino-4,6-dinitrophenol
2-amino-4-methylphenol-5-sulfonic acid
1-aminobenzene-2,5-dicarboxylic acid
2-amino-5-benzoylaminobenzoic acid
1-amino-2-hydroxynaphthalene-4-sulfonic acid
2 - amino - 1 - hydroxynaphthalene - 4,8 - disulfonic acid
2-aminonaphthalene-3-carboxylic acid The middle component employed in the preparation of the disazo dyestuffs of this invention is preferably 1,8-aminonaphthol-4-sulfonic acid or 2,8-aminonaphthol-6-sulfonic acid. However, other primary amino-napthol sulfonic acids may be employed, such as, for instance:

2-amino-5-hydroxynaphthalene-7-sulfonic acid
1-amino-5-hydroxynaphthalene-7-sulfonic acid
2 - amino - 8 - hydroxynaphthalene - 3,6 - disulfonic acid
1 - amino - 8 - hydroxynaphthalene - 3,6 - disulfonic acid
1 - amino - 8 - hydroxynaphthalene - 2,4 - disulfonic acid
2 - amino - 5 - hydroxynaphthalene - 1,7 - disulfonic acid Further, other aminonaphthol sulfonic acids containing a diazotizable amino group may be employed including those in which the diazotizable amino group is contained in an aromatic radical other than the naphthalene nucleus, as, for example:

2 - (4' - aminobenzoylamino) - 5 - hydroxynaphthalene-7-sulfonic caid
2 - (4' - amino - 3' - sulfophenylamino) - 8 - hydroxynaphthalene-6-sulfonic acid End coupling components employed according to the invention are preferably acylacetic acid arylides, particularly acetoacetanilides wherein the aniline residue may be unsubstituted or may contain substituents such as, for example, one or more chlorine atoms or methoxy groups. Other aromatic acylacetic acid type coupling components suitable for use as end components in preparing the dyestuffs of this invention include the following:

2-chloro - acetoacetanilide
4-nitro-acetoacetanilide
1-acetoacetylaminonaphthalene
4-phenylamino-acetoacetanilide
2,5-dimethyl-acetoacetanilide
4-acetoacetylaminobiphenyl
Acetoacetanilide -4-sulfonic acid
Benzoylacetone
Acetoacetic acid phenyl ester
Oxalylacetanilide
Benzoylacetonitrile The dyestuffs of the present invention are advantageously applied for coloring animal fibers such as wool or silk, and synthetic polyamide fibers such as nylon, from an acid bath, and the coloration may be metallized by treatment with a chromium compound such as potassium dichromate or other suitable metallizing agent (such as compounds of copper, nickel, cobalt, etc.) before, during or after the dyeing of the goods with the disazo dyestuff.

Moreover, the dyestuffs, according to the invention, may be metallized in substance as well as on the fiber, as for instance, by the procedure disclosed in U. S. P. 1,851,119, to yield products which can be applied directly to wool or other animal fiber, without requiring separate treatment of the goods with a metallizing agent. The dyestuffs of this invention are generally marketed in the form of their water-soluble salts (e. g., alkali metal or ammonium salts), which, when applied for dyeing in an acid dyebath, liberate the corresponding free acids, and which, when treated with metallizing compounds, especially chromium derivatives, yield the corresponding metallized dyestuffs. The appended claims accordingly include the dyestuffs of the invention, metallized or not, in the form of their water-soluble salts as well as in the form of the corresponding free acids.

Variations and modifications can be made in the specific products, herein disclosed, without departing from the scope of the invention, said products being described to illustrate the invention.

I claim:

1. A secondary disazo dyestuff which in the form of its sodium salt is 1,7-disazo-8-hydroxynaphthalene-4-sodium sulfonate wherein the azo group in the 1-position is linked to an acetoacetanilide radical, and the azo group in the 7-position is linked to a nitrophenol in the 2-position thereof, said nitrophenol being selected from the group consisting of 4-nitrophenol, 6-nitro-4-sulfophenol and 4-nitro-6-sulfophenol, said dyestuff dyeing animal fibers from an acid bath in level green to brown shades which when chromed yield green to olive shades having improved fastness to light as compared with the dyeings before chroming.

2. A secondary disazo dyestuff which in the form of its sodium salt is 1,7-disazo-8-hydroxynaphthalene-4-sodium sulfonate wherein the azo group in the 1-position is linked to an acetoacetanilide radical and the azo group in the 7-position is linked to 4-nitrophenol in the 2-position thereof, said dyestuff dyeing animal fibers from an acid bath in level green to brown shades which when chromed yield green to olive shades having improved fastness to light as compared with the dyeings before chroming.

3. A secondary disazo dyestuff which in the form of its sodium salt is a dark, water-soluble powder corresponding with the formula:

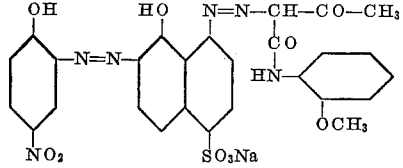

said dyestuff dyeing animal fiber from an acid bath in level, dull, dark brown shades which when chromed yield olive-green shades having excellent fastness to washing, fulling and light.

CARL IVAR ANDERSON.

REFERENCES CITED

The following references are of record in the file of this patent:

UNITED STATES PATENTS

| Number | Name | Date |
|---|---|---|
| 1,199,233 | Boeniger | Sept. 26, 1916 |
| 1,199,234 | Boeniger | Sept. 26, 1916 |

FOREIGN PATENTS

| Number | Country | Date |
|---|---|---|
| 78,024 | Switzerland | Jan. 2, 1919 |
| 78,031 | Switzerland | Jan. 2, 1919 |
| 78,032 | Switzerland | Jan. 2, 1919 |
| 128,726 | Great Britain | June 25, 1921 |
| 346,250 | Germany | Dec. 27, 1921 |

Certificate of Correction

Patent No. 2,474,024.  June 21, 1949.

CARL IVAR ANDERSON

It is hereby certified that errors appear in the printed specification of the above numbered patent requiring correction as follows:

Column 4, line 53, Example 3, for that portion of the formula reading "N=C" read $N=N$; columns 7 and 8, in the table, Example No. 15, in the column headed "First Component (A)", for "O$_2$H" read $O_2N$; Example No. 19, in the column headed "End Component (E)", for "CO$_3$COCH$_2$CONH" read $CH_3COCH_2CONH$;

and that the said Letters Patent should be read with these corrections therein that the same may conform to the record of the case in the Patent Office.

Signed and sealed this 15th day of November, A. D. 1949.

[SEAL]

THOMAS F. MURPHY,
*Assistant Commissioner of Patents.*